(12) United States Patent    (10) Patent No.: US 7,657,650 B2
Samanta et al.    (45) Date of Patent: Feb. 2, 2010

(54) RELIABLE AND EFFICIENT DATA TRANSFER OVER SERIAL PORT

(75) Inventors: Sumanesh Samanta, Kolkata (IN); Debal Krishna Mridha, WestBengal (IN)

(73) Assignee: LSI Corporation, Milpitas, CA (US)

( * ) Notice: Subject to any disclaimer, the term of this patent is extended or adjusted under 35 U.S.C. 154(b) by 450 days.

(21) Appl. No.: 11/654,311

(22) Filed: Jan. 16, 2007

(65) Prior Publication Data

US 2008/0133713 A1    Jun. 5, 2008

(51) Int. Cl.
     *G06F 15/16*    (2006.01)
(52) U.S. Cl. .................. 709/232; 370/104; 370/95; 375/211; 375/212; 455/7
(58) Field of Classification Search ............. 709/232; 370/104, 95; 375/211, 212; 455/7
See application file for complete search history.

(56) References Cited

U.S. PATENT DOCUMENTS

| | | | | |
|---|---|---|---|---|
| 4,625,308 A | * | 11/1986 | Kim et al. ............. | 370/321 |
| 5,383,185 A | * | 1/1995 | Armbruster et al. ........ | 370/447 |
| 6,243,411 B1 | * | 6/2001 | Chiou ................ | 375/211 |
| 6,952,276 B2 | * | 10/2005 | Sotokawa et al. ......... | 358/1.15 |
| 7,191,356 B2 | * | 3/2007 | Barr et al. .............. | 714/4 |

* cited by examiner

*Primary Examiner*—Tammy T Nguyen
(74) *Attorney, Agent, or Firm*—Raj Abhyanker LLP

(57) ABSTRACT

A system and method of reliable and efficient data transfer over serial port are disclosed. In one embodiment, a method of communicating data to a headless system over a communications medium includes transmitting data over the communications medium, ceasing transmitting data over communications medium in response to detecting a change in a status of a pin (e.g., a pin of a Modem Status Register, a Clear to Send, a $5^{th}$ bit of the Modem Status Register, etc.) on the communications medium, and repeating the transmitting data over the communications medium in response to receiving a request to resend the data. The method may include transmitting a size of the data (e.g., a 2 byte value) over the serial port.

3 Claims, 9 Drawing Sheets

| PIN NAME 202 | 25 PIN 204 | 9 PIN 206 | DIRECTION 208 | DESCRIPTION 210 |
|---|---|---|---|---|
| TXD | 2 | 3 | O | TRANSMIT |
| RXD | 3 | 2 | I | RECEIVE DATA |
| RTS | 4 | 7 | O | REQUEST TO SEND |
| CTS | 5 | 8 | I | CLEAR TO SEND |
| DTR | 20 | 4 | O | DATA TERMINAL READY |
| DSR | 6 | 6 | I | DATA SET RAEDY |
| RI | 22 | 9 | I | RING INDICATOR |
| DCD | 8 | 1 | I | DATA CARRIER DETECT |
| GND | 7 | 5 | - | SIGNAL GROUND |
| - | 1 | - | - | PROTECTIVE GROUND |

RELIABLE AND EFFICIENT DATA TRANSFER OVER SERIAL PORT

FIELD OF TECHNOLOGY

This disclosure relates generally to the technical fields of electronics and integrated circuit (IC) technology and, in one example embodiment, to reliable and efficient data transfer over serial port.

BACKGROUND

A method of sending data in a small packet may include a protocol that defines a packet structure (e.g., where the packet structure may contain a header and a pay-load). In the method, a receiver may receive a packet and/or check a sequence number of the packet. If there is a mismatch with the sequence number, the method may send a resend request for the packet to a sender of the packet. After receiving the resend request, the sender may send the packet again. Accordingly, the method may be time consuming and/or a speed of a serial communication between the sender and the receiver may slow down.

A handshaking may be another way of a data flow control. In a hardware handshaking, RTS (e.g., pin number 7 of a communication medium) and/or CTS (e.g., pin number 8 of the communication medium) of a communication medium (e.g., 9-pin and/or 25-pin) may be designed for the data flow control. One computer may signal with RTS (e.g., request to send) that the one computer wishes to send data, while the other computer may set CTS (e.g., clear to send) when the other computer is ready to receive the data. However, Implementation of the hardware handshaking may be difficult and/or time consuming.

In a software handshaking, two bytes called a XON (e.g., transmission on) and a XOFF (e.g., transmission off) that are not mapped to normal characters in an ASCII character set may be used. Whenever either one of two parties (e.g., computers) wants to interrupt a data flow from the other (e.g., full buffer), the either one of two parties may send the XOFF. When a buffer of the either one of two parties is purged again, the either one of two parties may send the XON to signal so that data may be sent again. However, the XON and/or the XOFF may be limited to text transmission and/or may not be used with binary data since binary files may tend to contain every single one of 256 characters.

In sum, the sending data in the small packet and/or the handshaking (e.g., hardware and/or software) may be difficult to implement. In addition, the sending data in the small packet and/or the handshaking may be time consuming and may even slow down a speed of communication between entities implementing the sending data in the small packet and/or the handshaking. Furthermore, a sophisticated algorithm (e.g., for a serial communication) may not be implemented in a pre-boot environment due to various limitations (e.g., limited memory, no Os support, single threaded, etc.).

SUMMARY

A system and method of reliable and efficient data transfer over serial port are disclosed. In one aspect, a method of communicating data to a headless system over a communications medium includes transmitting data over the communications medium, ceasing transmitting data over the communications medium in response to detecting a change in a status of a pin (e.g., a pin of a Modem Status Register, a Clear to Send, a $5^{th}$ bit of the Modem Status Register, etc.) on the communications medium, and repeating the transmitting data over the communications medium in response to receiving a request to resend the data. The method may include a size of the data (e.g., a 2 byte value) over the serial port.

In another aspect, a protocol of efficiently and reliably communicating data over a communications medium includes communicating data over the communications medium, communicating an error condition in the data through a status of a pin on the serial port, ceasing communicating the data after communicating the error condition, and repeating the communicating data over the communications medium after a request to resend the data. The communicating data over the serial port may include transmitting data over the serial port. Also, the communicating the error condition in the data through the status of the pin on the serial port may include detecting the error condition in the data by detecting the status of the pin on the serial port.

Furthermore, the communicating data over the serial port may include receiving data over the serial port. The communicating the error condition in the data through the status of the pin on the serial port may include signaling the error condition in the data by changing the status of the pin on the serial port. In addition, the method may include cleaning a buffer of receiving data over the serial port, and transmitting a request to resend the data. The error condition may be a parity error and/or may include a time out.

In yet another aspect, a method over a serial port using a firmware call from a BIOS library may include communicating data over the serial port, communicating an error condition in the data through a status of a pin of the serial port, and ceasing communicating the data. The communicating data over the serial port may include transmitting data over the serial port, and/or receiving data over the serial port.

In addition, the transmitting data over the serial port and/or receiving data over the serial port may run simultaneously on separate threads on a computer. A size of the data may be communicated over the serial port. In addition, the method may include clearing a receive buffer in response to the error condition in the data. A size of the data may be large compared to a size of the receive buffer. The data may be used to control a computer at a pre-boot stage.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 2 is a table diagram of pin names and pins, according to one embodiment.

Other features of the present embodiments will be apparent from the accompanying drawings and from the detailed description that follows.

DETAILED DESCRIPTION

A system and method of reliable and efficient data transfer over serial port are disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
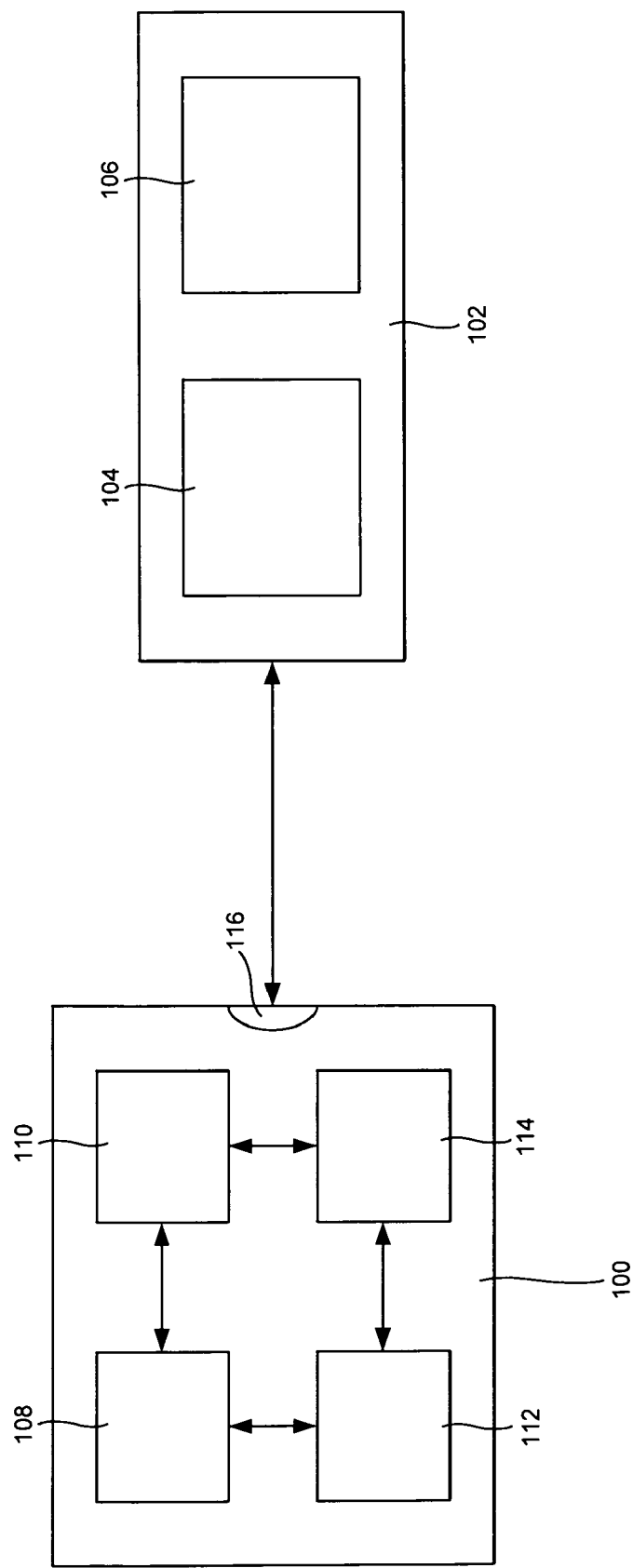
FIG. 1 is a block diagram of a remote system communicating with a target system, according to one embodiment.

In one aspect, a method of communicating data to a headless system (e.g., a headless system 102 of FIG. 1) over a communications medium (e.g., a communications medium 116 of FIG. 1) includes transmitting data over the communications medium, ceasing transmitting data over the communications medium in response to detecting a change in a status of a pin (e.g., a pin of a Modem Status Register, a Clear to Send, a $5^{th}$ bit of the Modem Status Register, etc.) on the communications medium (e.g., using a change detect module 108 of FIG. 1), and repeating the transmitting data over the communications medium in response to receiving a request to resend the data (e.g., as illustrated in FIG. 1).

In another aspect, a protocol of efficiently communicating data over a communications medium includes communicating data over the communications medium, communicating an error condition in the data through a status of a pin (e.g., a pin of Modem Control register, RTS, a $2^{nd}$ bit of MCR) on the serial port (e.g., using an error condition module 112 of FIG. 1), ceasing communicating the data after communicating the error condition (e.g., using a cease module 110 of FIG. 1), and repeating the communicating data over the communications medium after a request to resend the data.

In yet another aspect, a method over a serial port (e.g., a serial port 118 of FIG. 1) using a firmware call from a BIOS library (e.g., a bios library 114 of FIG. 1) may include communicating data over the serial port (e.g., the communications medium 116 of FIG. 3), communicating an error condition in the data through a status of a pin of the communications medium (e.g., as described in FIGS. 1-3), and ceasing communicating the data. The communicating data over the serial port may include transmitting data over the serial port, and/or receiving data over the serial port.

FIG. 1 is a block diagram of a remote system 100 communicating with a target system, according to one embodiment. Particularly, the FIG. 1 illustrates the remote system 100 containing a change detect module 108, a cease module 110, a error condition module 112, a BIOS library 114, a communications medium 116, and a headless system 102 containing a resident application 104 and a firmware 106, according to one embodiment.

The remote system 100 may be a software and/or a hardware (e.g., a desktop, an optical computer, a DNA computer, a computerized machine, an operating system, etc.) that may be used to configure a target system (e.g., for communicating data through serial communication) through a serial port in a pre-boot environment. The remote system 100 may include the change detect module 108, cease module 110, error condition module 112, BIOS library 114 and communications medium 116.

The headless system 102 may be a software and/or a hardware (e.g., a desktop, a mainframe computer, a server, a controller etc.) that may be configured through a serial port of the remote system 100 of FIG. 1. The headless system 102 may be configured with the help of an algorithm that may allow communicating large chunk data at high baud rates that may work in any environment (e.g., pre-boot environment). The headless system 102 may consist of resident application 104 and firmware 106. The resident application 104 may be an application program (e.g., application software, operating system, algorithm, etc.) that may process the algorithm (e.g., by accessing the code-id) for communicating the large chunk data (e.g., in small packets) between the remote system 100 and the headless system 102 of FIG. 1 at high baud rates, reliably and efficiently. The resident application 104 may track the code-id used by the protocol. The resident application 104 may also access any errors (e.g., parity error) in the data communicated between the remote system 100 and the headless system 102 of the FIG. 1 with the help of the protocol used for the serial communication.

The resident application 104 may also recover the lost data due to the error with the help of the protocol used for serial communication. The firmware 106 may be uploaded software program (e.g., a algorithm) on a hardware device (e.g., headless system 102 of FIG. 1). The firmware 106 may provide necessary instructions for how the device communicates with the remote system 100 of FIG. 1. The change detect module 108 may detect a change in a status of the pin on the communications medium (e.g., communications medium 116 of FIG. 1 and FIG. 3) communicating the data between the remote system 100 and the headless system 102.

The cease module 110 may cease transmitting data over the communications medium (e.g., the communications medium 116 of FIG. 1) in response to detecting a change in a status of the pin on the communication medium (e.g., communications medium 116 of FIG. 1 and FIG. 3) and may also retransmitting data over the communications medium (e.g., the communications medium 116 of FIG. 1) in response to receiving a request to resend the data from the headless system 102.

The error condition module 112 may detect the status of the pin on the serial port (e.g., communications medium 116 of FIG. 1 and FIG. 2) to detect the error (e.g., parity error, timeout error, etc.) in the data that may be transmitted and/or received, run simultaneously on separate threads of computer. The error condition module 112 may communicate the error condition (e.g., parity error, time out error, etc.) in the data to be transmitted to the headless system 102 through the status of the pin (e.g., pin of a modem control register) in the serial port by signaling the error condition in the data by changing the status of the pin on the serial port (e.g., communications medium 116 of FIG. 1 and FIG. 3).

The bios library 114 may be a set of library functions (e.g., software codes) for coordinating the hardware (e.g., serial communications, processor, hard drives, keyboard, etc.) used in the remote system 100 and/or may also determine the working of the computer without accessing programs from a disk. The communications medium 116 may be a serial port (e.g., 25 pin port, 9 pin port, etc) that may be used for the communicating the large chunk data between remote system 100 and the headless system 102 of FIG. 1 at high baud rates reliably and efficiently.

In example embodiments illustrated in FIG. 1, remote system 100 communicates with the headless system 102 containing resident application 104 and firmware 106. The headless system 102 communicates with the remote system 100 containing the change detect module 108, the cease module 110, the error condition module 112, bios library 114 and the communications medium 116 (e.g., the 25 pin or 9 pin serial port) as illustrated in FIG. 1. In another example embodiment, the change detect module 108, the cease module 110, and the error condition module 112 may reside in the resident application 104.

Figure 3:
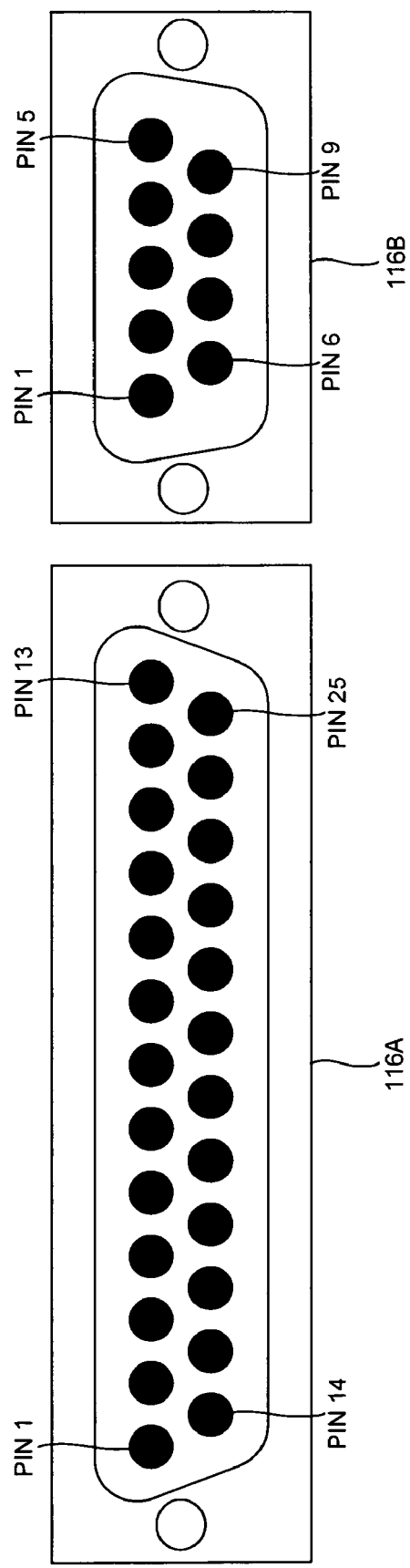
FIG. 3 is a port view associated with the pins described in the table diagram of FIG. 2, according to one embodiment.

For example, a method of communicating data to a headless system (e.g., headless system 102 of FIG. 1) over a communications medium (e.g., communications medium may be associated with a serial port of a remote system 100) indicates transmitting data over the communications medium (e.g., the communications medium 116 of FIG. 3). A transmitting data over the communications medium (e.g., the communications medium 116 of FIG. 3) may be ceased in response to detecting a change (e.g., by change detect module 108 of FIG. 1) in a status of a pin on the communications medium (e.g., the communications medium 116 of FIG. 1). Also, the transmitting data over the communications medium (e.g., the communications medium 116 of FIG. 1) may be repeated in response to receiving a request to resend the data. Moreover, the method may include transmitting a size of the data over the serial port (e.g., the communications medium 116 of FIG. 3).

Similarly, a protocol of efficiently communicating data over a communications medium (e.g., the communications medium 116 of FIG. 1) includes communicating data over the communications medium (e.g., the communications medium may be a serial port). Also an error condition in the data may be communicated through a status of a pin on the serial port (e.g., the communications medium 116 of FIG. 3). In addition, the communicating data may be ceased (e.g., through the cease module 110 of FIG. 1) after communicating the error condition. Furthermore, the communicating data may be repeated over the communications medium (e.g., the communications medium 116 of FIG. 1) after a request to resend the data. A method over a serial port (e.g., the communications medium 116 of FIG. 3) using a firmware call from a BIOS library (e.g., the bios library 114 of FIG. 1) includes communicating data over the serial port (e.g., the communications medium 116 of FIG. 3).

An error condition in the data may be communicated through a status of a pin of the serial port. The communicating data may be ceased (e.g., the cease module 110 of FIG. 1). The communicating data over the serial port (e.g., the communications medium 116 of FIG. 3) may include transmitting data over the serial port (e.g., the communications medium 116 of FIG. 3), and receiving data over the serial port. Also, the data (e.g., the data may be used to control a computer at a pre-boot stage) may be transmitted and/or received over the serial port run simultaneously on separate threads on a computer.

FIG. 2 is a table diagram of pin names and pins, according to one embodiment. Particularly, FIG. 2 illustrates a table 200, a pin name field 202, a 25 pin field 204, a 9 pin field 206, a direction field 208, and a description field 210, according to one embodiment. The table 200 may include information related to the status of the pin and the function of the each pin that may be used for communicating the data between the remote system 100 and the headless system 102 of FIG. 1. The pin name field 202 may indicate the designation of the pins that may be used for reliable and efficient data transfer from the remote system 100 to the headless system 102. The 25 pin field 204 may indicate the size of the data the pin can transfer from remote system 100 to headless system 102. The direction field 208 may indicate the direction of the data transfer from the pin. The description field 210 may indicate the function (e.g., transmit, receive, request to send, etc.) of the pin used for data transfer.

The pin name field 202 displays "TXD" in first row, "RXD" in the second row, "RTS" in the third row, "CTS" in the fourth row, "DTR" in the fifth row, "DSR" in the sixth row, "RI" in the seventh row, "DCD" in the eight row, "GND" in the ninth row, "-" in the tenth row of the pin name field 202 column of the table 200 illustrated in FIG. 2. The 25 pin field 204 displays "2" in first row, "3" in the second row, "4" in the third row, "5" in the fourth row, "20" in the fifth row, "6" in the sixth row, "22" in the seventh row, "8" in the eight row, "7" in the ninth row, "1" in the tenth row that may refer to the size of the data transferred of the 25 pin field 204 column of the table 200 illustrated in FIG. 2. The 9 pin field 206 displays "3" in first row, "2" in the second row, "7" in the third row, "8" in the fourth row, "4" in the fifth row, "6" in the sixth row, "9" in the seventh row, "1" in the eight row, "5" in the ninth row, "-" in the tenth row of the 9 pin field 206 column of the example embodiment of the table 200 illustrated in FIG. 2.

The direction field 208 displays "o" in first row, "i" in the second row, "o" in the third row, "i" in the fourth row, "o" in the fifth row, "i" in the sixth row, "i" in the seventh row, "i" in the eight row, "-" in the ninth row, "-" in the tenth row of the direction field column of the example embodiment of the table 200 illustrated in FIG. 2. The description field 210 displays "Transmit" in first row, "Receive Data" in the second row, "Request To Send" in the third row, "Clear To Send" in the fourth row, "Data Terminal Ready" in the fifth row, "Data Set Ready" in the sixth row, "Ring Indicator" in the seventh row, "Data Carrier Detect" in the eight row, "Signal Ground" in the ninth row, "Protective Ground" in the tenth row of the description field 210 column of exemplary table 200 illustrated in FIG. 2.

FIG. 3 is a port view associated with the pins described in the table diagram of FIG. 2, according to one embodiment. Particularly, FIG. 3 illustrates a communications medium 116 A and a communications medium 116 B, according to one embodiment. The communications medium 116A may be a 25 pin serial port that may be used as serial communication physical medium for the transfer of the large chunk of data from the remote system 100 to the headless system 102 of FIG. 1.

The 25 pin serial port may transmit and receive the data at high baud rate and with absolute reliability run on separate threads on a computer. The 25 pin serial port may be physical interface device that may be employed in the input and/output port of the remote system 100 and/or headless system 102 of FIG. 1. The 25 pin serial port may be used for configuring the target device in the pre-boot environment. A serial port may use signals/special characters in the interface to pause and resume the transmission of data.

The communications medium 116B may be a 9 pin serial port that may be used for serial communication between the remote system 100 and headless system 102 illustrated in FIG. 1. The 9 pin communication medium (e.g., the communications medium 116 of FIG. 3) may be a physical interface device (e.g., the communications medium 116 of FIG. 3)

employed at the input and/or output port of the remote system 100 and/or headless system of FIG. 1 that may be used for communication of the large chunk data with absolute reliability and high baud rate. The serial port (e.g., the communications medium 116 of FIG. 3) may be used to configure the controller (e.g., headless system 102 of FIG. 1) from a remote system 100 in the pre-boot environment. The serial port of 9 pin may use the signals/special characters to receive and/or send data from remote system 100 and/or headless system 102 of FIG. 1.

The FIG. 3 illustrates communication medium used for serial communication in two distinct examples (e.g., 25 pin and 9 pin). In first example communications medium 116A illustrates a 25 pin serial port device that may be used as a physical interface device for communicating the data at high baud rates. The communication medium may contain the 25 pins aligned in two rows. The first row may have 13 pins and the second row may contain 12 pins each having its own functional significance in serial communication at high efficiency. The communications medium 116B depicts the serial port (e.g., the communications medium 116 of FIG. 3) having 9 pins. The communication medium (e.g., the communications medium 116 of FIG. 1) may contain the 25 pins aligned in two rows. The first row may contain 5 pins and second row may contain 4 pins; each may contribute in the communicating the data efficiently. The size of the data may be a 2 byte value. Also the pin may be represented by a bit of a Modem Status Register (MSR). The pin (e.g., 25 pin, 9 pin) may be Clear to Send (CTS), or a $5^{th}$ bit of the MSR.

Figure 4:
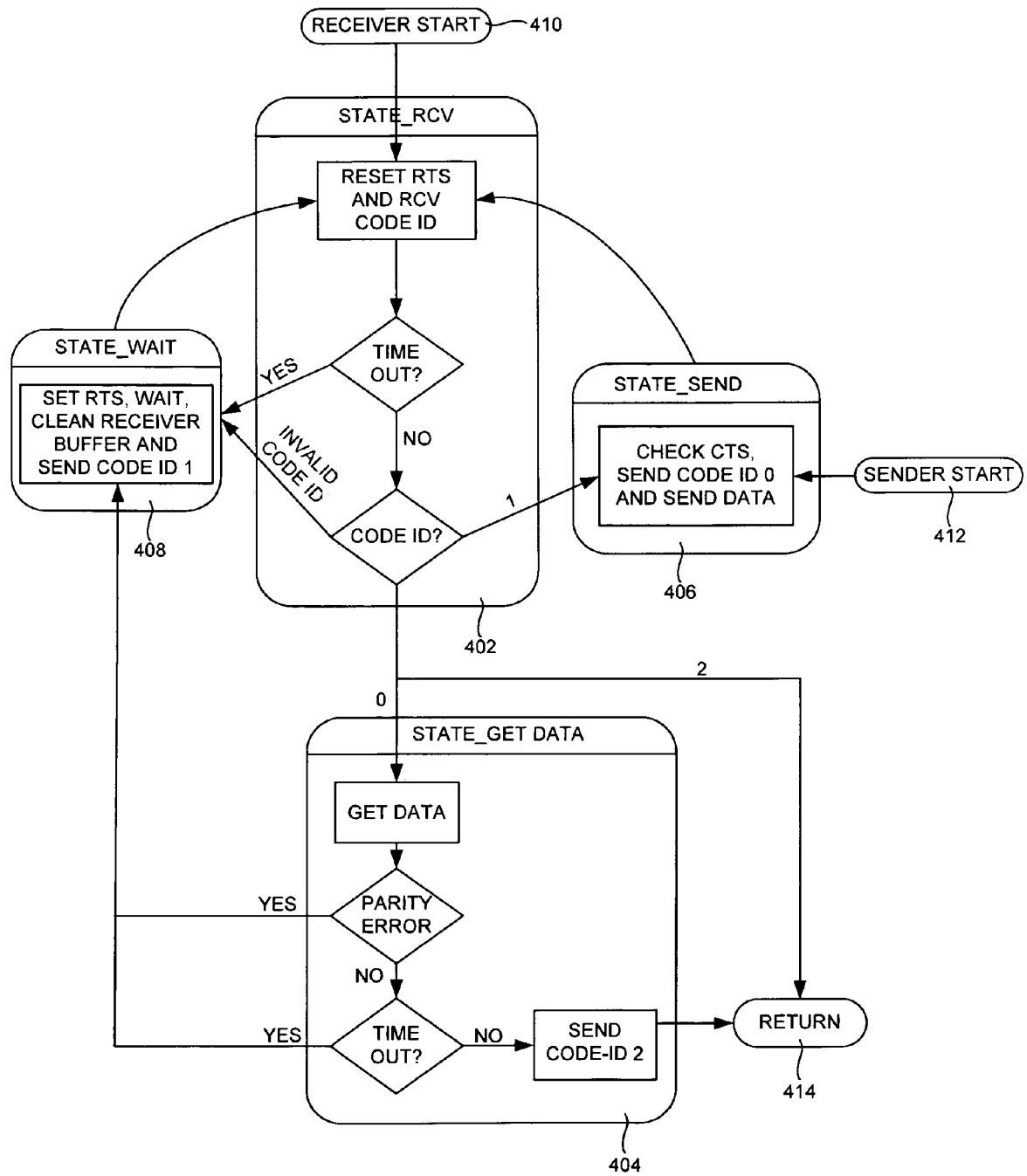
FIG. 4 is a state machine diagram of a 'send and receive' process where an error can be communicated only from a "receiver" end, according to one embodiment.

FIG. 4 is a state machine diagram of a 'send and receive' process where an error can be sent only from a "receiver" end, according to one embodiment. Particularly, FIG. 4 illustrates a state_rcv 402, a state_get data 404, a state_send 406, a state_wait 408, a receiver_start 410, a sender_start 412, and a return 414, according to one embodiment. The state_rcv 402 may reset RTS (e.g., reset the $2^{nd}$ bit of modem control register). The state_rcv 402 then may scan a port until a character is read into a variable (e.g., which may be denoted as c). If the received character is zero (e.g., c=0), the state_get data 404 may be invoked. If the received character is 1 (e.g., c=1), the state_send 406 may be invoked. If the received character is 2 (e.g., c=2), the return 414 may be invoked. Otherwise, the state_wait 408 may be invoked.

The state_get data 404 may first read 2 bytes as a length into a SizeofCurbuffer (e.g., which may be an unsigned integer) and then read a number of bytes equal to the SizeofCurbuffer as data into a Curbuffer (e.g., which may be a character array). The state_get data 404 may return if the length and/or data is read successfully (e.g., a return value is positive integer), a timeout occurs (e.g., the return value −1), and/or a parity error occurs (e.g., the return value −2). If a return value is greater than 0 (e.g., t>0), the state_get data 404 may send 2 as a code-id and/or return SUCCESS. If the return value is −1 (e.g., t=−1) or −2 (e.g., t=−2), the state_wait 408 may be invoked.

The state_send 406 may send 0 as the code-id, send two bytes as the length (e.g., the length of the sizeofCurbuffer) and/or send the SizeofCurbuffer bytes as data from the Curbuffer. The state_send 406 may return if the length and data is sent successfully and/or the CTS (e.g., clear to send) may be set (e.g., 5th bit of MSR (modem status register may be set). The state_send 406 may also go to state_rcv 402.

The state_wait 408 may set the RTS (e.g., set the $2^{nd}$ bit of MCR), wait sometime, clean the receiver buffer by reading the port, send 1 as the code-id, and/or go to the state_rcv 402. The Receiver (e.g., see the receiver start 410) may start from the state_rcv 402. When the receiver returns, data may be in the CurBuffer and/or the length of data will be the SizeofCurBuffer. The sender (e.g., the sender start 412) may start from the state_send 406. The sender (e.g., the sender start 412) may copy data (e.g., that you want to send) into the CurBuffer, set the SizeofCurBuffer equal to the length of the data, and/or go to the state_send 406.

Figure 5:
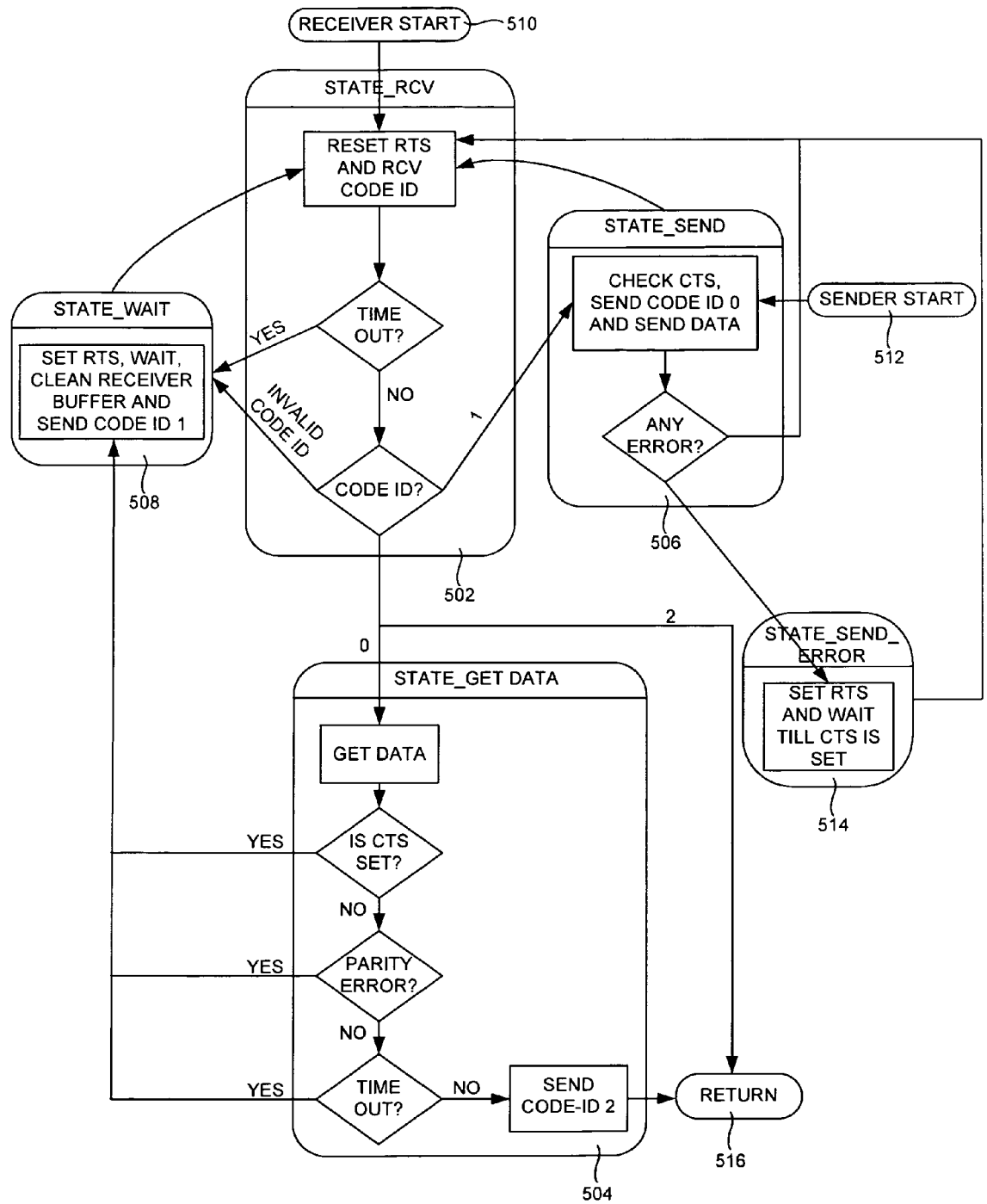
FIG. 5 is state machine diagram of a 'send and receive' process where an error can be communicated from both the "sender" and the "receiver" end, according to one embodiment.

FIG. 5 is a state machine diagram of a 'send and receive' process where an error can be communicated from both a "sender" and the "receiver" end, according to one embodiment. Particularly, FIG. 5 illustrates a state_rcv 502, a state_get data 504, a state_send 506, a state_wait 508, a receiver_start 510, a sender_start 512, and the state_send_error 514, and a return 516, according to one embodiment. The state_rcv 502 may reset RTS (e.g., reset the $2^{nd}$ bit of modem control register). The state_rcv 502 then may scan a port until a character is read into a variable (e.g., which may be denoted as c). If the received character is zero (e.g., c=0), the state_get data 504 may be invoked. If the received character is 1 (e.g., c=1), the state_send 506 may be invoked. If the received character is 2 (e.g., c=2), the return 516 may be invoked. Otherwise, the state_wait 508 may be invoked.

The state_get data 504 may first read 2 bytes as a length into a SizeofCurbuffer (e.g., which may be an unsigned integer) and then read a number of bytes equal to the SizeofCurbuffer as data into a Curbuffer (e.g., which may be a character array). The state_get data 504 may return if the length and/or data is read successfully (e.g., a return value is positive integer), the CTS is set, a timeout occurs (e.g., the return value −1), and/or a parity error occurs (e.g., the return value −2). If a return value is greater than 0 (e.g., t>0), the state_get data 504 may send 2 as a code-id and/or return SUCCESS. If the return value is −1 (t=−1) or −2 (e.g., t=−2), the state_wait 508 may be invoked.

The state_send 506 may send 0 as the code-id, send two bytes as the length (e.g., the length of the sizeofCurbuffer) and/or send the SizeofCurbuffer bytes as data from the Curbuffer. The state_send 506 may return if the length and data is sent successfully, any error occurs at "Sender" end and/or the CTS may be set. If any error occurs at "Sender" end then state_send 506 goes to state_send_error 514. Otherwise state-send 506 may go to state_rcv 502.

The state_wait 508 may set the RTS, wait sometime, clean the receiver buffer by reading the port, send 1 as the code-id, and/or go to the state_rcv 502. The receiver (e.g., see the receiver start 510) may start from the state_rcv 502. When the receiver returns, data may be in the CurBuffer and/or the length of data will be the SizeofCurBuffer. The sender (e.g., the sender start 512) may start from the state_send 506. The sender (e.g., the sender start 512) may copy data (e.g., that you want to send) into the CurBuffer, set the SizeofCurBuffer equal to the length of the data, and/or go to the state_send 506. The state_send_error may set the RTS and wait till the CTS is set and/or go to the state_rcv 502.

Figure 6:
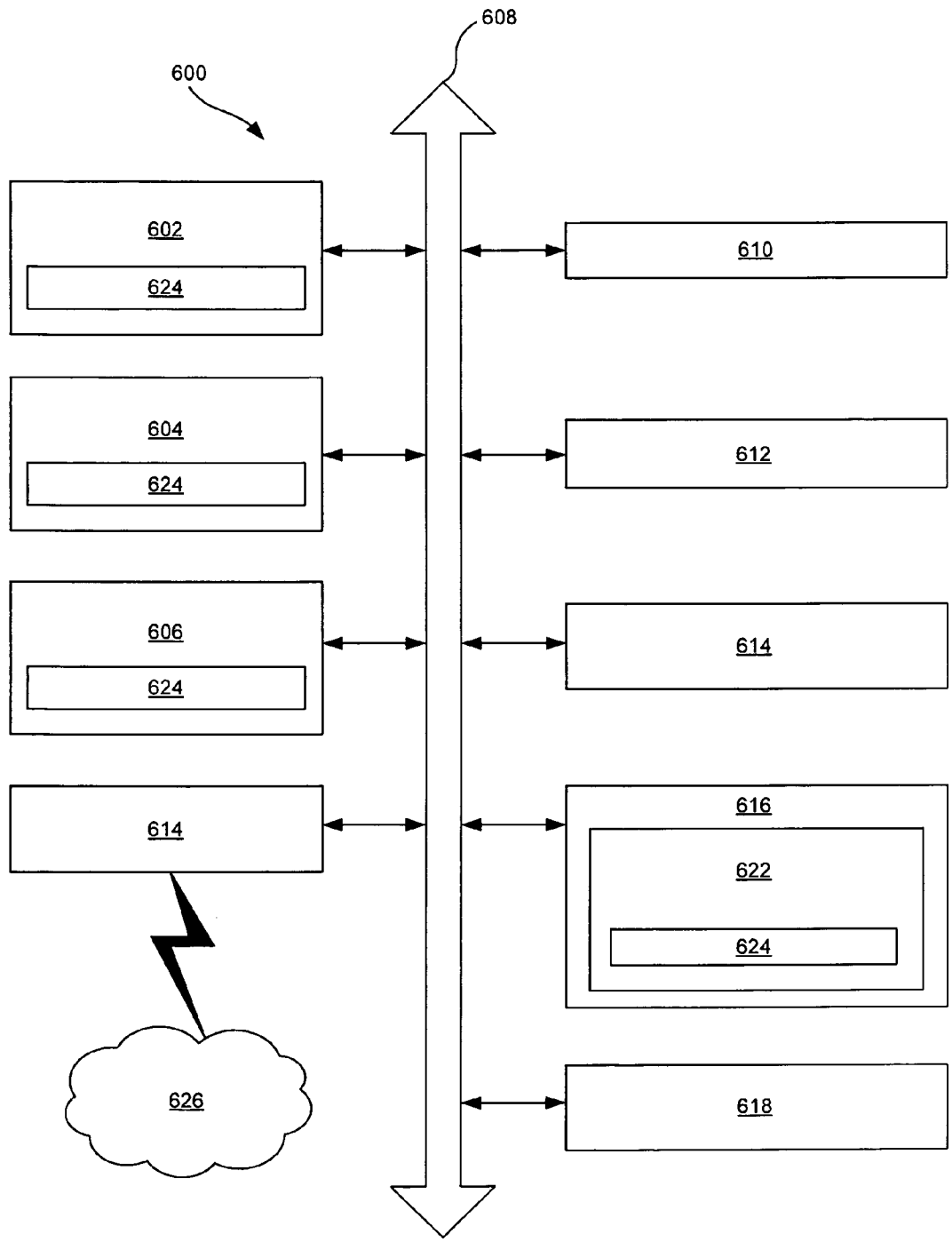
FIG. 6 is a diagrammatic representation of a data processing system capable of processing a set of instructions to perform any one or more of the methodologies herein, according to one embodiment.

FIG. 6 is a diagrammatic system view 600 of a data processing system in which any of the embodiments disclosed herein may be performed, according to one embodiment. Particularly, the system view 600 of FIG. 6 illustrates a processor 602, a main memory 604, a static memory 606, a bus 608, a video display 610, an alpha-numeric input device 612, a cursor control device 614, a drive unit 616, a signal generation device 618, a machine readable medium 622, instructions 624, and a network 626, according to one embodiment.

The diagrammatic system view 600 may indicate a personal computer and/or a data processing system in which one or more operations disclosed herein are performed. The processor 602 may be microprocessor, a state machine, an application specific integrated circuit, a field programmable gate array, etc. (e.g., Intel® Pentium® processor). The main memory 604 may be a dynamic random access memory and/or a primary memory of a computer system. The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse.

The drive unit 616 may be a hard drive, a storage system, and/or other longer term storage subsystem. The signal generation device 618 may be a bios and/or a functional operating system of the data processing system. The machine readable medium 622 may provide instructions on which any of the methods disclosed herein may be performed. The instructions 624 may provide source code and/or data code to the processor 602 to enable any one/or more operations disclosed herein.

Figure 7:
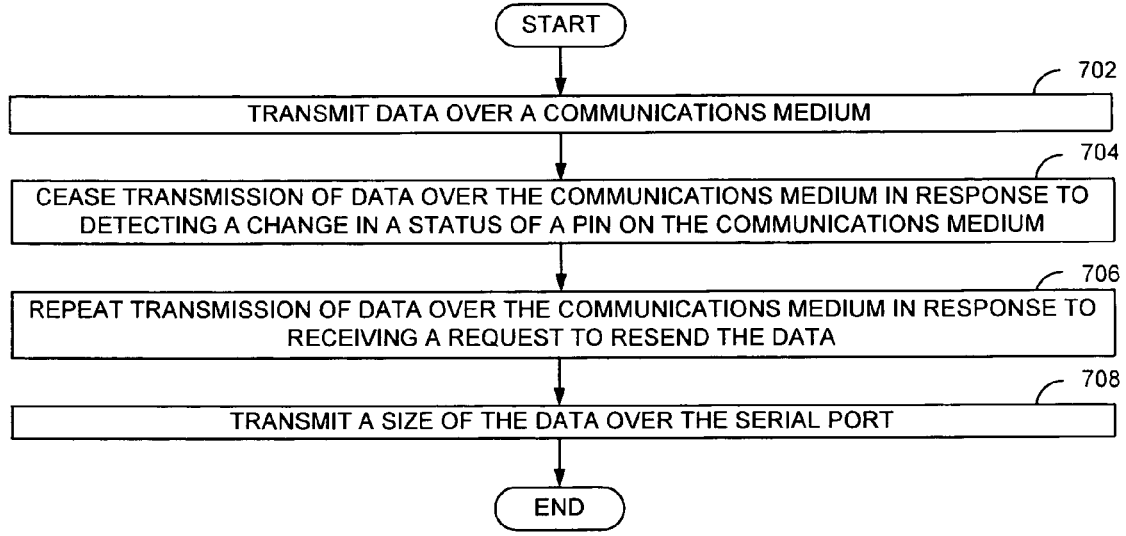
FIG. 7 is a process flow of communicating data to a headless system over a communications medium, according to one embodiment.

Furthermore, the machine-readable medium may include communicating a size of the data (e.g., a size of the data may be large compared to a size of the receive buffer) over the serial port. In addition, the machine-readable medium may include clearing a receive buffer in response to the error condition in the data FIG. 7 is a process flow of communicating data to a headless system (e.g., the headless system 102 of FIG. 1) over a communications medium (e.g., the communications medium 116 of FIG. 1), according to one embodiment. In operation 702, a data may be transmitted over a communications medium (e.g., the communications medium 116 of FIG. 3). In operation 704, transmission of the data may be ceased (e.g., through cease module 110 of FIG. 1) over a communications medium (e.g., the communications medium 116 of FIG. 1) in response to detecting a change in a status of a pin on the communication medium (e.g., the communications medium 116 of FIG. 1).

In operation 706, transmission of data may be repeated over the communications medium (e.g., the communications medium 116 of FIG. 1) in response to receiving a request to resend the data. In operation 708, a size of the data may be transmitted over the serial port (e.g., the communications medium 116 of FIG. 3).

Figure 8:
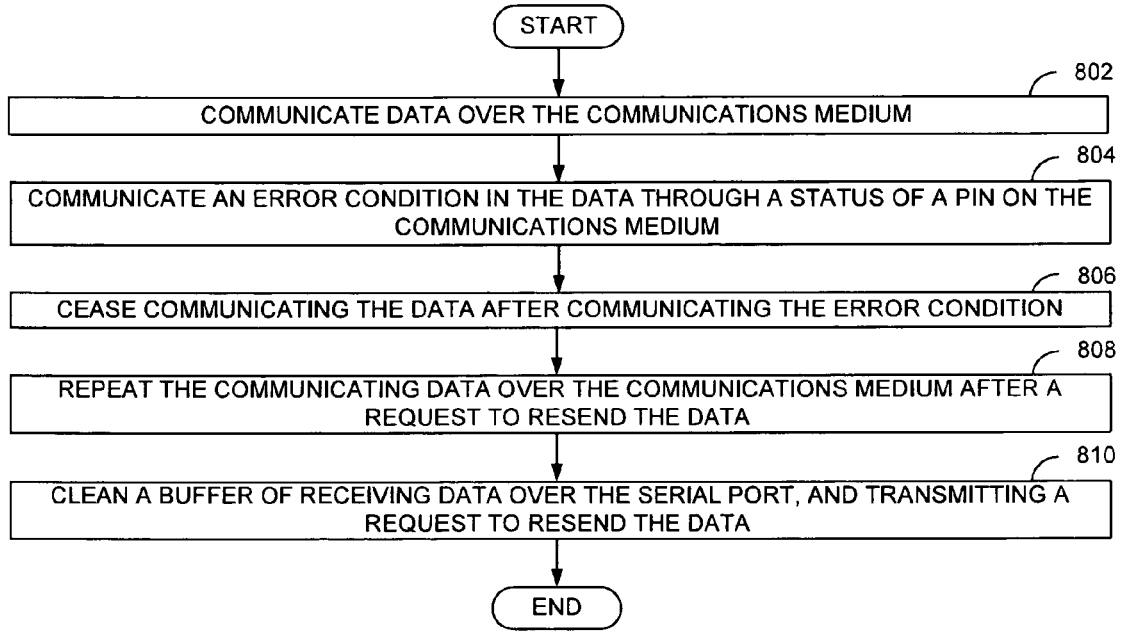
FIG. 8 is a process flow of efficiently and reliably communicating data over a communications medium, according to one embodiment.

FIG. 8 is a process flow of efficiently communicating data over a communications medium (e.g., the communications medium 116 of FIG. 1), according to one embodiment. In operation 802, a data may be communicated over the communications medium (e.g., the communications medium 116 of FIG. 1). In operation 804, an error condition in the data through a status of a pin on the serial port (e.g., the communications medium 116 of FIG. 3). In operation 806, the communicating data may be ceased after communicating the error condition (e.g., through error condition module 112 of FIG. 1). In operation 808, the communicating data may be repeated over the communications medium (e.g., communications medium 116 of FIG. 1) after a request to resend the data. In operation 810, a buffer of receiving data may be cleaned over the serial port (e.g., the communications medium 116 of FIG. 3) and a request may be transmitted to resend the data.

Figure 9:
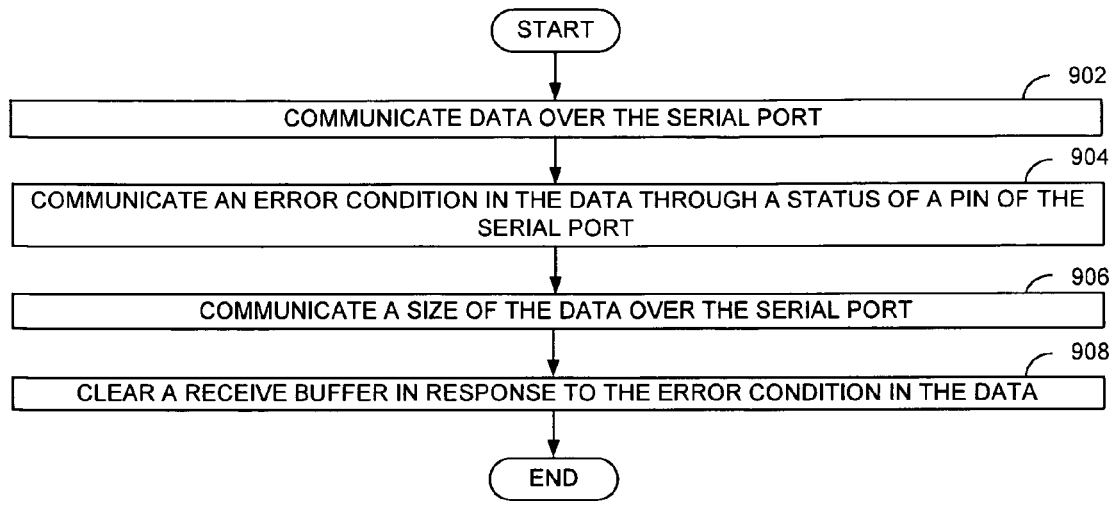
FIG. 9 is a process flow of a method over a serial port using a firmware call from a BIOS library, according to one embodiment.

FIG. 9 is a process flow of a method over a serial port (e.g., the communications medium 116 of FIG. 3) using a firmware call from a BIOS library (e.g., bios library 114 of FIG. 1), according to one embodiment. In operation 902, a data may be communicated over the serial port (e.g., the communications medium 116 of FIG. 3). In operation 904, an error condition in the data may be communicated through a status of a pin of the serial port (e.g., the communications medium 116 of FIG. 3). In operation 906, a size of the data may be communicated over the serial port (e.g., the communications medium 116 of FIG. 3). In operation 908, a receive buffer may be cleared in response to the error condition to the data (e.g., through error condition module 112 of FIG. 1).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of communicating data to a headless system over a communications medium, comprising:
   transmitting data over the communications medium, wherein the communication medium is a serial port that may be used for communicating the large chunk data between a remote system and the headless system at high baud rates reliably and efficiently;
   ceasing transmitting data over the communications medium in response to detecting a change in a status of a pin on the communications medium, wherein the pin is at least one of a pin of a Modem Status Register (MSR), Clear to Send (CIS), and a 5th bit of the MSR; and
   repeating the transmitting data over the communications medium in response to receiving a request to resend the data;
   wherein the communications medium is associated with the serial port of the remote system;
   further comprising transmitting a size of the data over the serial port; and
   wherein the size of the data is a 2 byte value.

2. The method of claim 1 wherein the pin is the pin of the Modem Status Register (MSR).

3. The method of claim 2 wherein the pin is Clear to Send (CIS), or the 5th bit of the MSR.

* * * * *